United States Patent
Tsukagoshi

(10) Patent No.: US 12,289,029 B2
(45) Date of Patent: Apr. 29, 2025

(54) DRIVE UNIT FOR SERIES HYBRID VEHICLE

(71) Applicants: Nissan Motor Co., Ltd., Yokohama (JP); RENAULT S.A.S., Boulogne-Billancourt (FR)

(72) Inventor: Yuki Tsukagoshi, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 46 days.

(21) Appl. No.: 17/996,792

(22) PCT Filed: May 22, 2020

(86) PCT No.: PCT/IB2020/000504
§ 371 (c)(1),
(2) Date: Oct. 21, 2022

(87) PCT Pub. No.: WO2021/234425
PCT Pub. Date: Nov. 25, 2021

(65) Prior Publication Data
US 2023/0155445 A1    May 18, 2023

(51) Int. Cl.
*H02K 5/20*     (2006.01)
*B60K 6/26*     (2007.10)
(Continued)

(52) U.S. Cl.
CPC .............. *H02K 5/203* (2021.01); *B60K 6/26* (2013.01); *B60K 6/46* (2013.01); *H02K 9/19* (2013.01);
(Continued)

(58) Field of Classification Search
CPC ............. H02K 5/20; H02K 5/203; H02K 9/22
(Continued)

(56) References Cited

U.S. PATENT DOCUMENTS

| 8,937,414 B2 | 1/2015 | Song et al. |
| 2015/0263583 A1* | 9/2015 | Urata ................ H02K 5/203 |
| | | 310/54 |

(Continued)

FOREIGN PATENT DOCUMENTS

| JP | 2003-87908 A | 3/2003 |
| JP | 2003087908 A * | 3/2003 |

(Continued)

OTHER PUBLICATIONS

Machine translation of JP-2003087908-A (Year: 2003).*

*Primary Examiner* — Oluseye Iwarere
*Assistant Examiner* — Minki Chang
(74) *Attorney, Agent, or Firm* — Global IP Counselors LLP

(57) ABSTRACT

A drive unit includes an electric drive motor for driving and an electric generator motor in a series hybrid vehicle. Each of the motors includes a helical cooling passage helically surrounding an outer periphery of its stator. The first and second electric motors are housed in an outer housing such that the rotor axes are parallel. The helical cooling passages of the motors are connected in series via a connecting passage. The coolant outlet of the upstream helical cooling passage is connected to the connecting passage. The coolant inlet of the downstream helical cooling passage is connected to the connecting passage. The coolant outlet of the upstream helical cooling passage and the coolant inlet of the downstream helical cooling passage are arranged at end portions on the same side in a direction of the rotor axes.

10 Claims, 16 Drawing Sheets

(51) Int. Cl.
  *B60K 6/46* (2007.10)
  *H02K 9/19* (2006.01)
  *H02K 9/22* (2006.01)
  *H02K 11/33* (2016.01)
(52) U.S. Cl.
  CPC ............... *H02K 9/22* (2013.01); *H02K 11/33* (2016.01); *B60Y 2200/92* (2013.01); *B60Y 2306/05* (2013.01); *B60Y 2400/60* (2013.01)
(58) Field of Classification Search
  USPC ........................................ 310/54, 58, 59, 64
  See application file for complete search history.

(56) References Cited

U.S. PATENT DOCUMENTS

2018/0339583 A1\* 11/2018 Hirai ...................... H02K 5/203
2019/0131851 A1\* 5/2019 Herb ...................... H02K 9/197

FOREIGN PATENT DOCUMENTS

| JP | 2004-327283 A | 11/2004 |
| JP | 2012-257347 A | 12/2012 |
| JP | 2020-78215 A | 5/2020 |
| WO | 2012/148189 A2 | 11/2012 |
| WO | 2015/098328 A1 | 7/2015 |

\* cited by examiner

DRIVE UNIT FOR SERIES HYBRID VEHICLE

CROSS-REFERENCE TO RELATED APPLICATIONS

This application is a U.S. national stage application of International Application No. PCT/IB2020/000504, filed on May 22, 2020.

BACKGROUND

Technical Field

The present invention relates to a drive unit for a series hybrid vehicle.

Background Information

WO2015/098328A1 discloses a water-cooled electric motor in which a helical cooling passage is formed inside a housing in which a stator is fixed, and a coolant inlet provided at one end of the cooling passage and a coolant outlet provided at the other end open to the outer periphery of the housing.

SUMMARY

In a series hybrid vehicle equipped with two electric motors, one for power generation and the other for driving, the two electric motors are arranged in close proximity with the rotational axes parallel to each other in order to make a drive unit including the two electric motors more compact. If a cooling passage, which has the coolant inlet and the coolant outlet as in the above-described document, is applied to the two electric motors of a series hybrid vehicle, the cooling passage of one and the cooling passage of the other would be connected in series. That is, the coolant outlet of one electric motor is connected to the coolant inlet of the other electric motor. However, if the two electric motors are arranged with the rotational axes parallel, as described above, the coolant outlet of the one electric motor and the coolant inlet of the other electric motor are separated in the axial direction, resulting in a longer connecting passage to connect them and, hence, a larger drive unit. The longer cooling liquid passage also results in greater pressure loss.

Thus, an object of the present invention is to provide a drive unit that is compact and also able to suppress pressure loss in the cooling passage.

According to one aspect of the present invention, a drive unit for a series hybrid vehicle is provided that comprises a first electric motor for driving and a second electric motor for power generation. In this drive unit, a first cylindrical inner housing provided on the outer periphery of the stator of the first electric motor and a second cylindrical inner housing provided on the outer periphery of the stator of the second electric motor are each provided with a helical cooling passage on the respective outer peripheries, formed so as to surround each stator in helical fashion. The first electric motor and the second electric motor are housed in an outer housing such that the rotor axes are parallel, the helical cooling passage of the first electric motor and the helical cooling passage of the second electric motor are connected in series via a connecting passage, and the coolant outlet of the helical cooling passage on the upstream side to which one end of the connecting passage is connected and the coolant inlet of the helical cooling passage on the downstream side to which the other end of the connecting passage is connected are arranged at the end portions on the same side in the direction of the rotor axis.

BRIEF DESCRIPTION OF THE DRAWINGS

Referring now to the attached drawings which form a part of this original disclosure.

DETAILED DESCRIPTION OF EMBODIMENTS

Embodiments of the present invention will be described below with reference to the drawings.

Outline of Drive Unit

Figure 1:
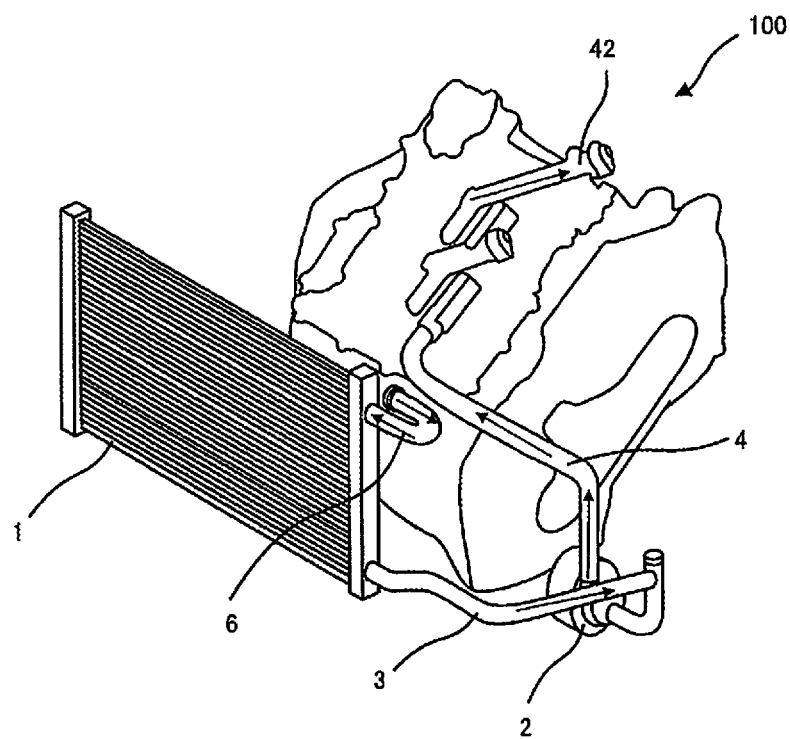
FIG. 1 is an external view of a drive unit according to an embodiment.

FIG. 1 is an external view of a drive unit 100 according to an embodiment. The drive unit 100 is used to drive a series hybrid vehicle and includes a drive motor 15, a generator motor 17, an inverter 13, a speed reduction mechanism 18, and a speed increase mechanism 19, which will be described further below. Further, the drive motor 15 and the generator motor 17 are water-cooled, and the drive unit 100 is equipped with a water-cooled cooling system. The cooling system consists of a radiator 1, a water pump 2, external cooling passages 3-6, and internal cooling passages. The internal cooling passages consist of an inverter cooling passage 42 formed integrally with the inverter 13, a drive motor cooling passage (not shown) that cools the drive motor 15, and a generator motor cooling passage (not shown) that cools the generator motor 17, which are interconnected in the housing of the drive unit 100. These internal cooling passages will be described in detail below.

Coolant cooled by the radiator 1 flows into the inverter cooling passage 42 via the first external cooling passage 3, the water pump 2, and the second external cooling passage 4, passes through the drive motor cooling passage and the generator motor cooling passage, and returns to the radiator 1 via the third external cooling passage 6. In this manner, in the drive unit 100 of this embodiment, the inverter 13, the drive motor 15, and the generator motor 17 are cooled using the internal cooling passages, so that the external cooling passages only require two paths, the path from the radiator 1 to the drive unit 100 (first external cooling passage 3 and second external cooling passage 4), and the path from the drive unit 100 to the radiator 1 (the third external cooling passage 6).

Figure 2:
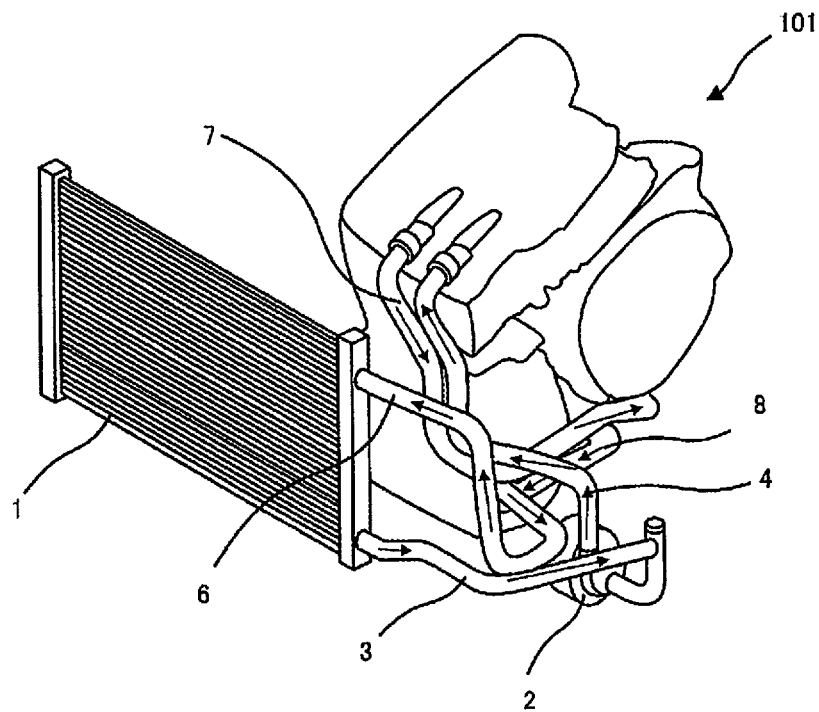
FIG. 2 is an external view of a drive unit according to a comparative example.

FIG. 2 shows a drive unit 101 as a comparative example. The drive unit 101 of the comparative example is the same as the drive unit 100 in that the inverter 13, the drive motor 15, and the generator motor 17 are integrated, but the cooling passages for cooling these elements are connected via external cooling passages. That is, in addition to the first external cooling passage 3, the second external cooling passage 4, and the third external cooling passage 6 of FIG. 1, an external cooling passage 7 that connects a cooling passage for the inverter and a cooling passage for the drive motor, as well as an external cooling passage 8 that connects the cooling passage for the drive motor and a cooling passage for the generator motor are required.

As described above, the drive unit 100 and the cooling system of this embodiment have fewer external cooling passages than the drive unit 101 and the cooling system of the comparative example. That is, the drive unit 100 and the cooling system of this embodiment have a more compact configuration than the configuration of the comparative example and have greater flexibility of design of the layout when mounted in a vehicle.

Figure 3:
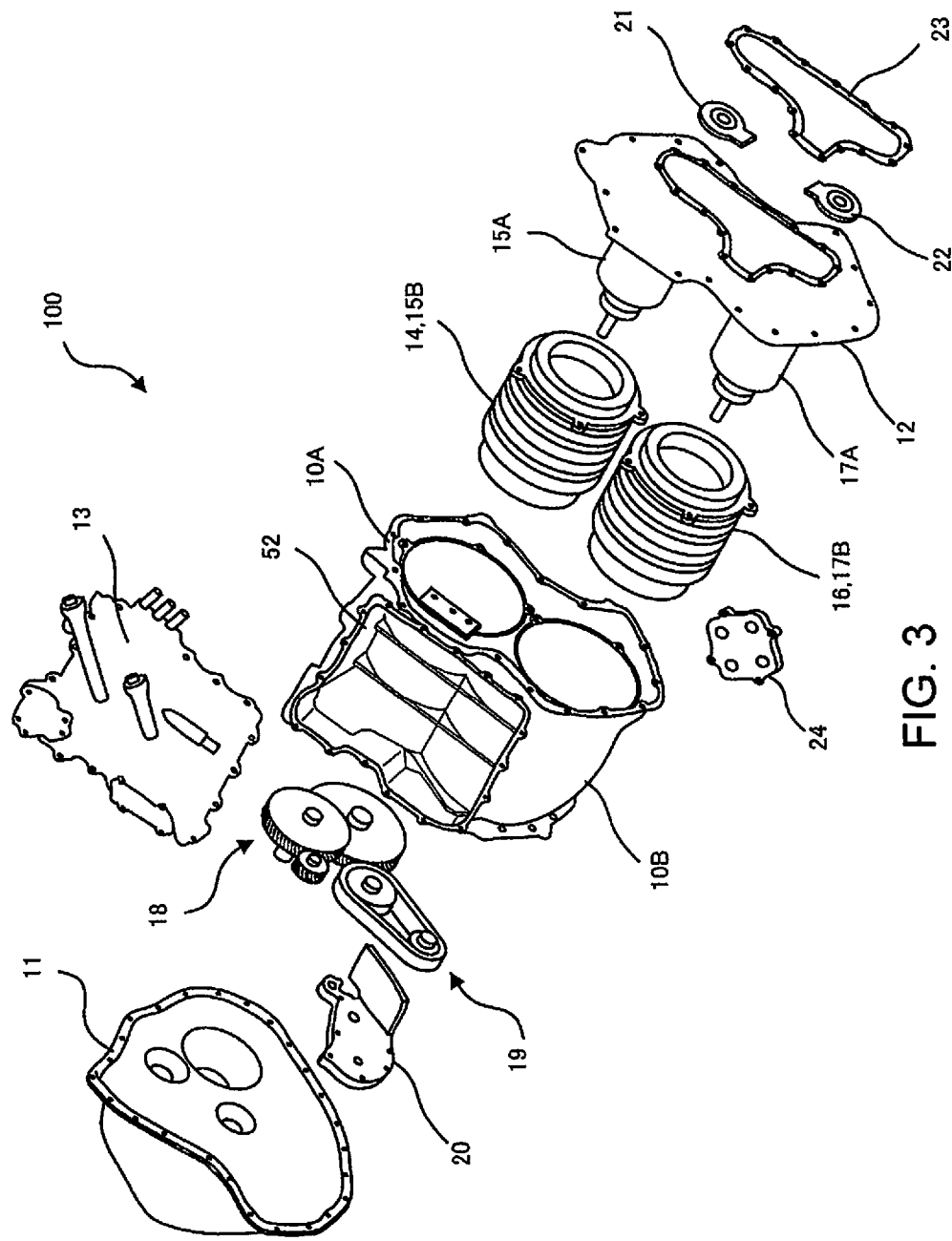
FIG. 3 is an exploded view of the drive unit according to the embodiment.

FIG. 3 is an exploded view of the drive unit 100 according to this embodiment.

The housing of the drive unit 100 comprises an outer housing 10, a gear cover 11 that is attached to one end portion of the outer housing 10, and a rear cover 12 that is attached to the other end portion of the outer housing 10.

The outer housing 10 has the form of two parallel cylindrical sections. The drive motor 15 and a first inner housing 14 in which the drive motor is accommodated are housed in one cylindrical portion, and the generator motor 17 and a second inner housing 16 in which the generator motor is accommodated are housed in the other cylindrical portion. The drive motor 15 consists of a stator 15B that is fixed inside the inner housing 14 and a rotor 15A that is fixed to the rear cover 12. Similarly, the generator motor 17 also consists of a stator 17B that is fixed inside the inner housing 16 and a rotor 17A that is fixed to the rear cover 12.

Figure 4:
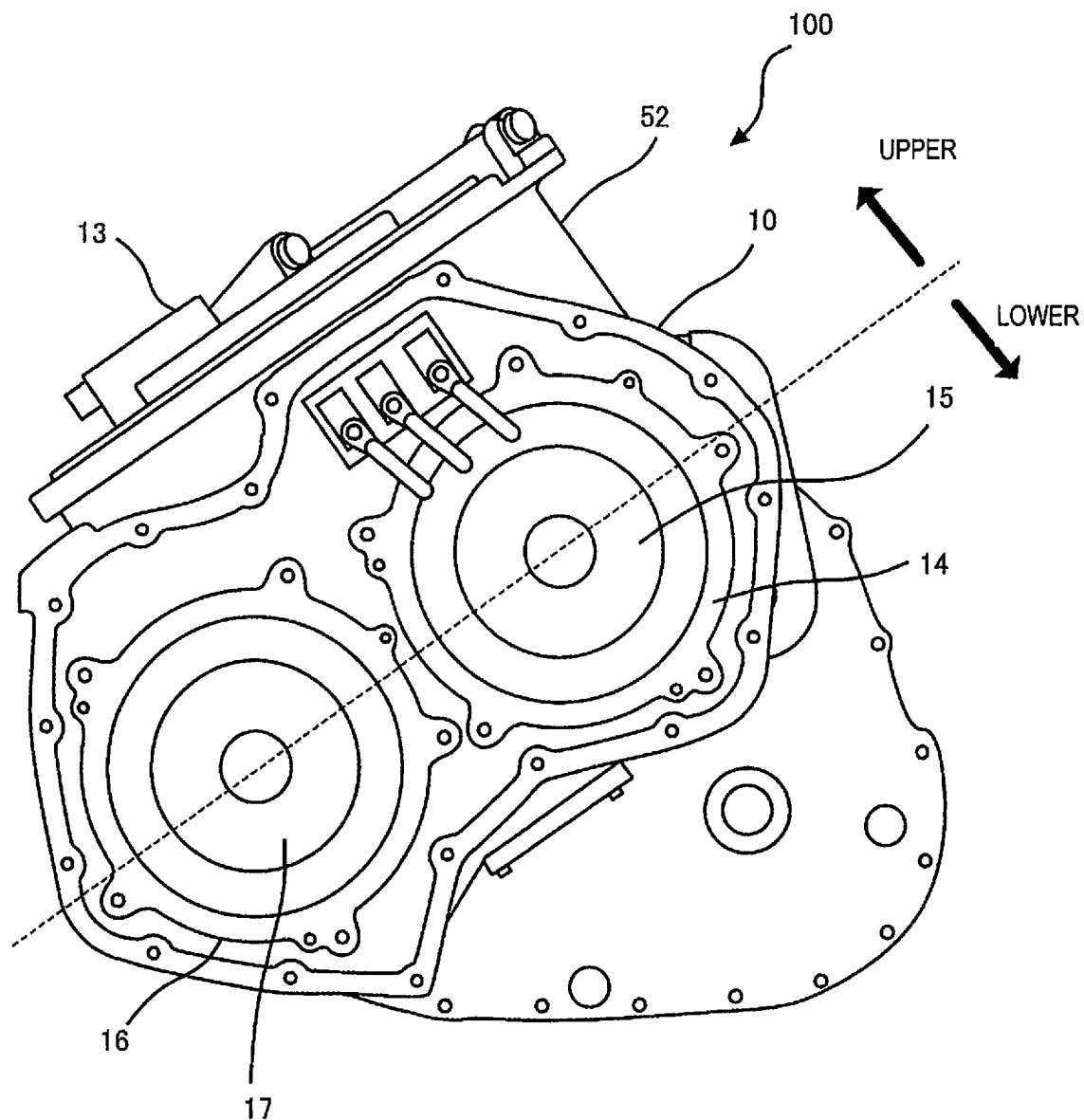
FIG. 4 is a view of the drive unit as seen from the rotor axis direction.

Further, the inverter 13 is mounted on the upper portion of the outer housing 10. The upper portion here is the part above the plane that includes the axis of rotation of the drive motor 15 and the axis of rotation of the generator motor 17. Although the drive unit 100 may be mounted in the vehicle in a state in which the plane that includes the axes of rotation of the two motors 15, 17 is inclined with respect to the horizontal direction, as shown in FIG. 4, in this embodiment, the part above the plane in the perpendicular direction is referred to as the upper side, and the part below the plane is referred to as the lower side.

The gear cover 11 houses the speed decrease mechanism 18 connected to the drive motor 15, the speed increase mechanism 19 connected to the generator motor 17, and a mechanical pump 20.

A sensor 21 that detects the rotational speed of the drive motor 15, a sensor 22 that detects the rotational speed of the generator motor 17, and a sensor cover 23 that covers these sensors are attached to the rear cover 12.

Further, a shielding plate 24, described further below, is attached to the outer housing 10.

Inner Housing

The inner housings 14, 16 will now be described. The first inner housing 14 and the second inner housing 16 have the same structure and are thus referred to as inner housing IHSG when there is no need to distinguish between them.

Figure 5:
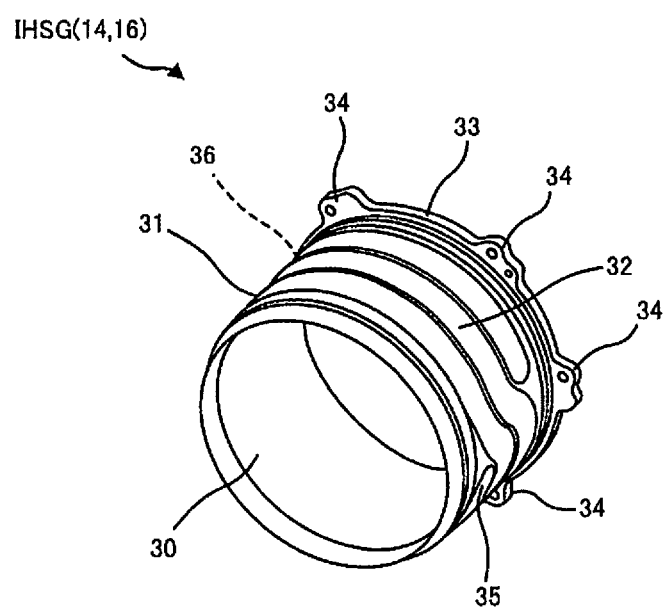
FIG. 5 is an external view of an inner housing.

FIG. 5 is an external view of the inner housing IHSG.

The stators of the motors 15, 17 are fixed to inner circumference 30 of the inner housing IHSG. A helical groove 32 is formed from one end to the other of outer circumferential surface 31 of the inner housing IHSG. When the inner housing IHSG is housed in the outer housing 10, the upper opening of the groove 32 is closed by the inner circumferential surface of the outer housing 10, thereby forming a helical cooling passage (hereinafter referred to as the helical cooling passage 32). However, the upper openings at both ends of the helical cooling passage 32 are not closed, even when housed in the outer housing 10, and function as an inlet for introducing coolant into, or an outlet for discharging coolant from, the helical cooling passage 32. In this embodiment, the end portion on the opposite side of a flange 33 of the helical cooling passage 32 is referred to as a first opening 35, and the end portion on the flange side is referred to as a second opening 36. The reason for providing the helical cooling passage 32 from one end of the inner housing IHSG to the other is to cover the cooling passage 32 from one axial end to the other of the outer periphery of each of the motors 15, 17 in contact with the inner circumference 30 of the inner housing IHSG, in order to further enhance the cooling effect.

Figure 7:
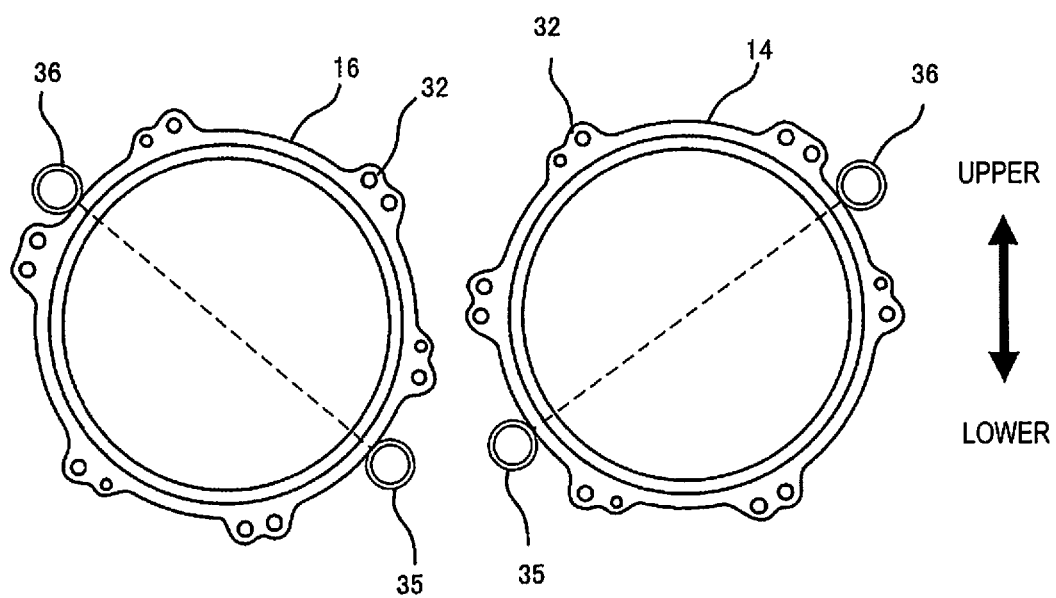
FIG. 7 is a view of FIG. 6 as seen from the direction of the rotor axis.

The helical cooling passage 32 is formed such that the first opening 35 and the second opening 36 are positioned to form a prescribed angle with respect to the central axis when seen from the direction of the rotor axis, as shown in FIG. 7, described further below. As described above, the helical cooling passage 32 is provided from one end of the inner housing IHSG to the other from the standpoint of the cooling effect, so that if the position of the first opening 35 is set, the position of the second opening 36 will also be set. That is, it is not possible to set the position of the first opening 35 independently of the position of the second opening 36.

Further, one end of the inner housing IHSG has a flange 33 with a plurality of fastening parts 34 for securing the inner housing to the rear cover 12 using bolts or the like. The rear cover 12 is fixed to the outer housing 10, resulting in the inner housing IHSG being fixed to the outer housing 10 via the rear cover 12. The inner housing IHSG may be directly fixed to the outer housing 10.

Figure 6:
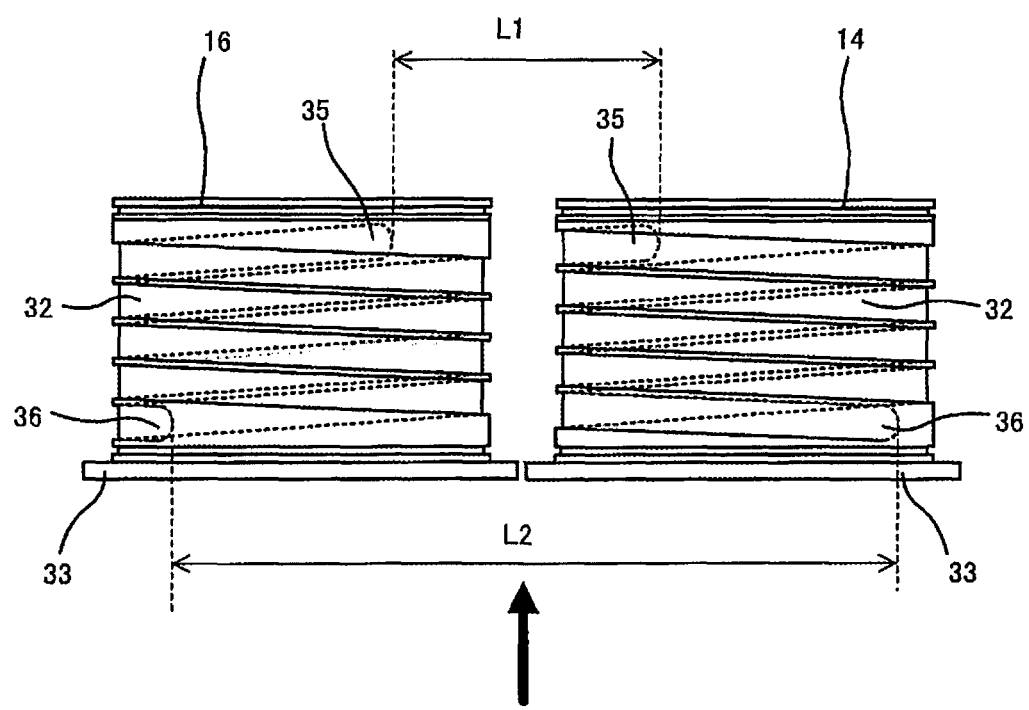
FIG. 6 is a top view of an example of the arrangement of two inner housings.

The state in which the first inner housing 14 and the second inner housing 16 are housed in the outer housing 10 will now be described. FIG. 6 is a top view of the first inner housing 14 and the second inner housing 16 in the housed state. FIG. 7 is a view of the first inner housing 14 and the second inner housing 16 of FIG. 6 as seen from the flange 33 side.

The first inner housing 14 and the second inner housing 16 are aligned so that their respective central axes are parallel and their respective flanges 33 are adjacent. Further, the first inner housing 14 and the second inner housing 16 are housed in the outer housing 10 so that their respective helical cooling passages 32 are in different phases. Here, phase means the mounting angle with respect to the outer housing 10. That is, for example, as shown in FIG. 7, the straight line connecting the first opening 35 and the second opening 36 of the first inner housing 14 and the straight line connecting the first opening 35 and the second opening 36 of the second inner housing 16 are at different angles to the vertical direction of the outer housing 10 (the direction of the arrow in the figure).

In this embodiment, as shown in FIG. 6, the inner housings IHSG are housed in the outer housing 10 with a phase in which the first openings 35 of the adjacent inner housings IHSG are close to each other, and the second openings 36 of the adjacent inner housings IHSG are far from each other. This makes the distance L1 from the first opening 35 of the first inner housing 14 to the first opening 35 of the second inner housing 16 shorter than the distance L2 from the second opening 36 of the first inner housing 14 to the second opening 36 of the second inner housing 16.

Cooling Passages

The cooling passages in the drive unit 100 will be described with reference to FIGS. 8 to 12.

Figure 8:
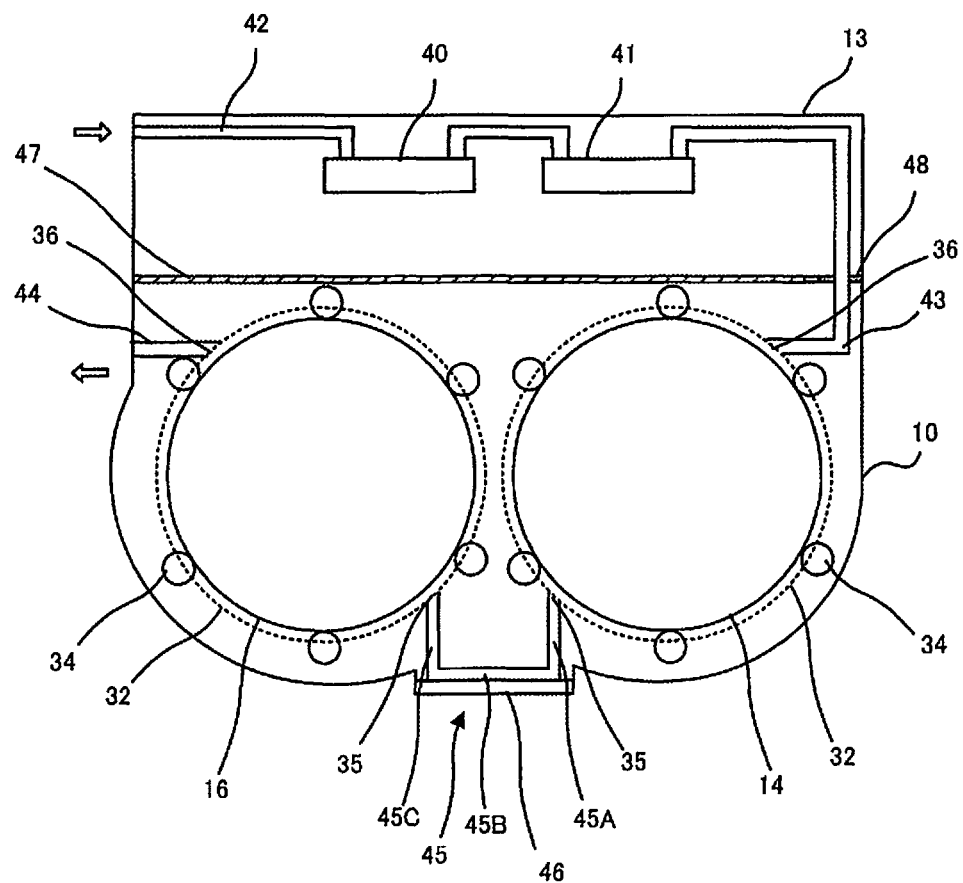
FIG. 8 is a schematic diagram of the drive unit as seen from the direction of the rotor axis.

FIG. 8 is a schematic diagram of the drive unit 100 as seen from the same direction as in FIG. 7.

The inverter 13 has a first power module 40 and a second power module 41 that constitute an inverter circuit and the inverter cooling passage 42 that cools the power modules. The inverter cooling passage 42 is configured such that coolant introduced from the water pump 2 cools the first power module 40 and then cools the second power module 41.

A liquid seal 47 for ensuring airtightness is interposed between the inverter 13 and the outer housing 10. An O-ring 48 for ensuring watertightness, which will be described further below, is disposed at a connecting portion between the inverter cooling passage 42 and an outer housing introduction passage 43, also described further below.

The inverter cooling passage 42 after passing through the second power module 41 is connected to the outer housing introduction passage 43 provided in the outer housing 10. The outer housing introduction passage 43 is connected to the second opening 36 of the first inner housing 14. That is, the second opening 36 of the first inner housing 14 functions as a coolant inlet. On the other hand, the first opening 35 of the first inner housing 14 functions as a coolant outlet.

The first opening 35 of the first inner housing 14 is connected to the first vertical passage 45A of a connecting channel or connecting passage 45, which includes the first vertical passage 45A, a horizontal passage 45B, a second vertical passage 45C, and a cover 46. The connecting passage 45 will be described further below.

The second vertical passage 45C of the connecting passage 45 is connected to the first opening 35 of the second inner housing 16. That is, the first opening 35 of the second inner housing 16 functions as a coolant inlet. On the other hand, the second opening 36 of the second inner housing 16 functions as a coolant outlet. An outer housing discharge passage 44 is connected to the second opening 36 of the second inner housing 16.

A connecting portion 49 between the inverter cooling passage 42 and the outer housing introduction passage 43 will now be described with reference to FIGS. 9 and 10.

Figure 9:
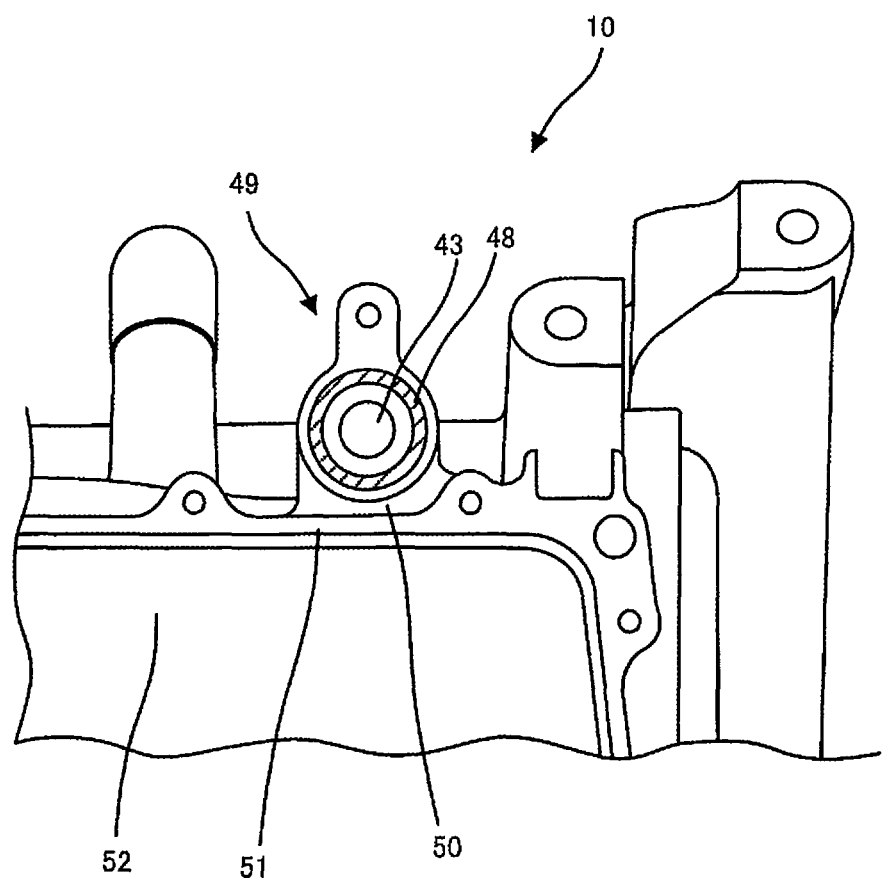
FIG. 9 is an enlarged view in the vicinity of the connecting portion of an outer housing.

FIG. 9 is an enlarged view in the vicinity of the connecting portion 49 of the outer housing 10. FIG. 10 shows a cross section of the connecting portion 49.

An inverter circuit placement area 52 is surrounded by a liquid seal placement surface 51. The outer housing introduction passage 43 is located on the outside of the inverter circuit placement area 52.

A trap groove 50 is provided between the liquid seal placement surface 51 and the connecting portion 49. As shown in FIG. 10, a groove may be formed in the inverter at a location opposite the trap groove 50. By providing the trap groove 50, even if the liquid seal 47 that is crushed as a result of fastening the inverter 13 to the outer housing 10 protrudes from the liquid seal placement surface 51, the protruding liquid seal 47 is accommodated in the trap groove 50. Thus, the watertightness realized by the O-ring 48 of the connecting portion 49 can be prevented from becoming impaired due to the protruding liquid seal 47.

The connecting passage 45 will now be described with reference to FIGS. 11 and 12.

Figure 11:
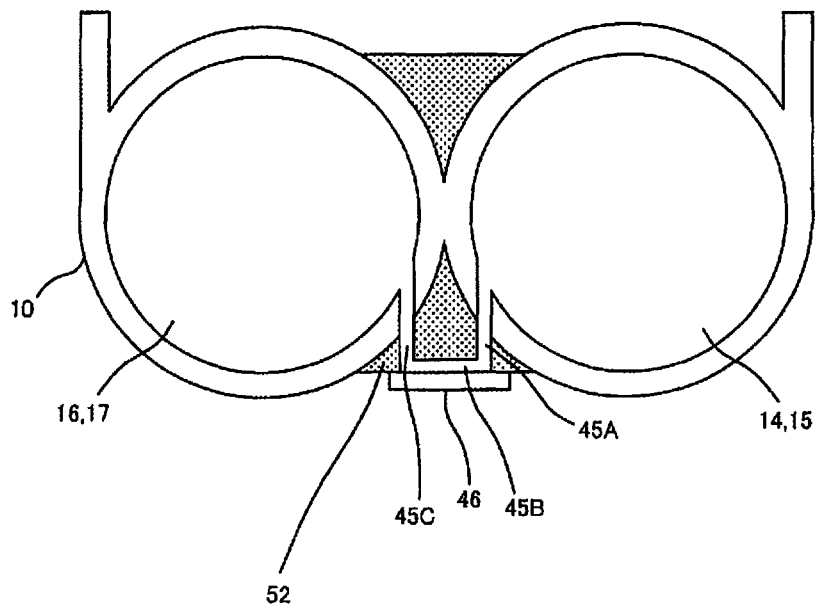
FIG. 11 is a schematic view of the outer housing from the direction of the rotor axis.
Figure 12:
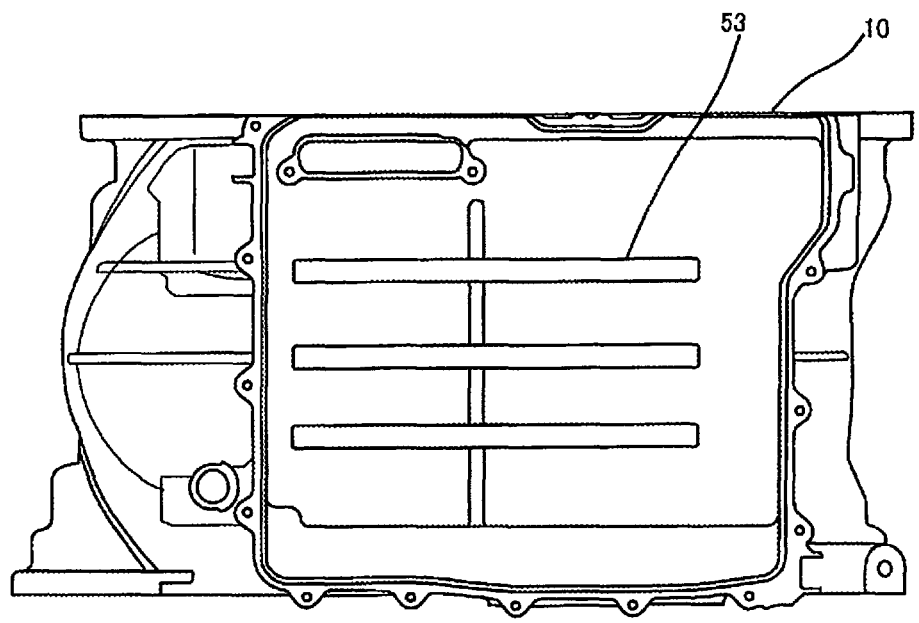
FIG. 12 is a schematic view of the outer housing from below.

FIG. 11 schematically shows a cross section of the outer housing 10, in which is housed the first inner housing 14, the drive motor 15, the second inner housing 16, and the generator motor 17, as seen from the direction of the rotor axis of the motors 15, 17. FIG. 12 shows the outer housing 10 as seen from below.

As described above, the outer housing 10 has the form of connected cylinders that house the drive motor 15 and the generator motor 17. A plurality of ribs 53 are formed in the valley sandwiched between the two cylindrical portions at prescribed intervals in the axial direction, as shown in FIG. 12. As shown in FIG. 11, the ribs 53 may be provided not only on the lower surface of the outer housing 10, but also on the upper surface.

One of the plurality of ribs 53 is provided such that the position thereof in the direction of the rotor axis is aligned with the first opening 35 of the first inner housing 14 and the first opening 35 of the second inner housing 16. The connecting passage 45, described above, is formed on this rib 53.

The first vertical passage 45A penetrates from a lower end surface of the rib 53 to the interior of the outer housing 10. The end portion of the first vertical passage 45A on the inner side of the outer housing 10 opens opposite to the first opening 35 of the first inner housing 14.

The second vertical passage 45C penetrates from the lower end surface of the rib 53 to the interior of the outer housing 10. The end portion of the second vertical passage 45C on the inner side of the outer housing 10 opens opposite to the first opening 35 of the second inner housing 16.

The horizontal passage 45B is a groove provided in the lower end surface of the rib 53, connecting the opening of the first vertical passage 45A and the opening of the second vertical passage 45C. When this groove is closed by the cover 46 from below, the first vertical passage 45A, the horizontal passage 45B, and the second vertical passage 45C form the connecting passage 45 that connects the first opening 35 of the first inner housing 14 and the first opening 35 of the second inner housing 16.

[Coolant Flow]

The flow of the coolant through the drive unit 100 according to this embodiment will be described with reference to FIGS. 13 to 16.

Figure 13:
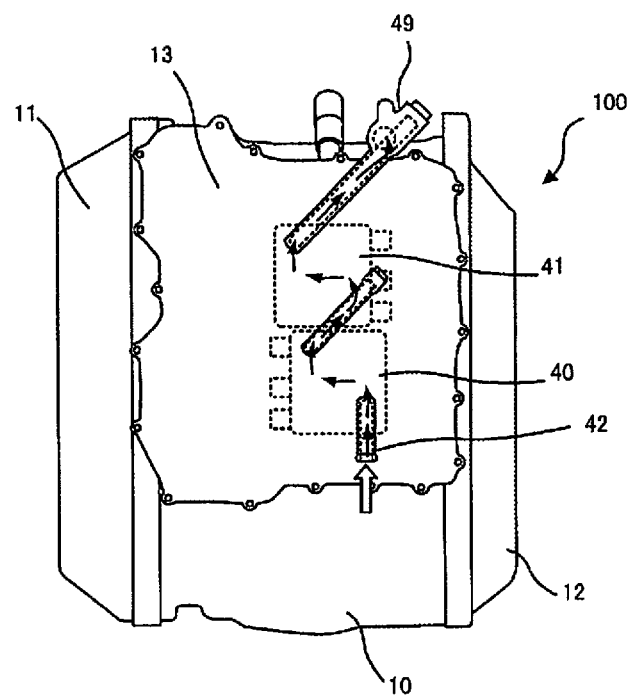
FIG. 13 is a first diagram explaining the cooling order of the embodiment.
Figure 14:
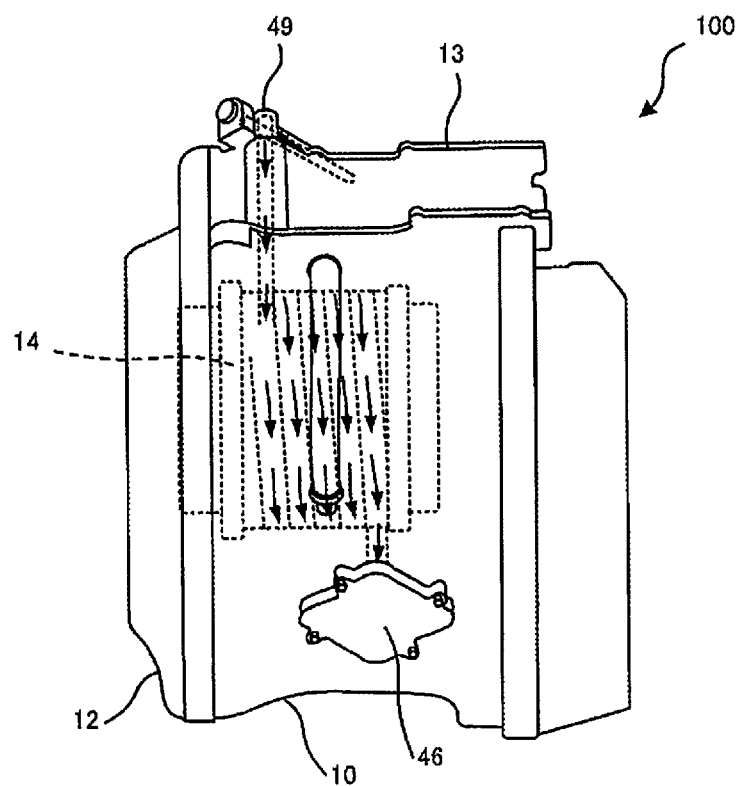
FIG. 14 is a second diagram explaining the cooling order of the embodiment.
Figure 15:
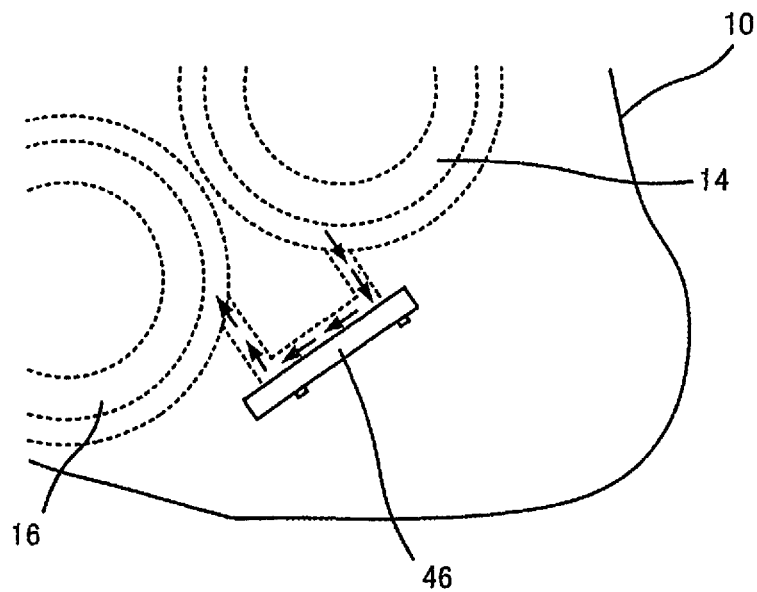
FIG. 15 is a third diagram explaining the cooling order of the embodiment.
Figure 16:
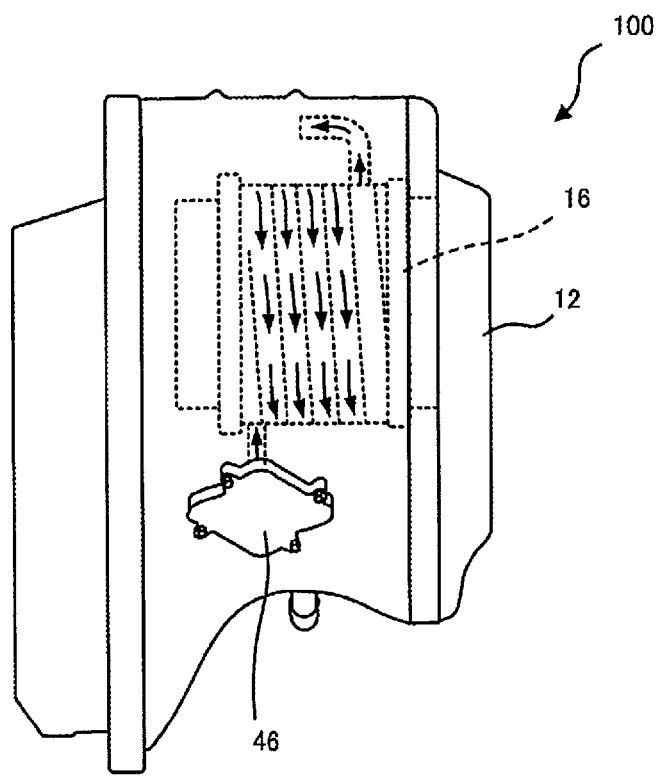
FIG. 16 is a fourth diagram explaining the cooling order of the embodiment.

FIG. 13 is a top view of the drive unit 100. FIG. 14 is a view of the drive unit 100 from the side on which the drive motor 15 is housed, that is, the drive unit 100 is viewed from above the plane of the paper of FIG. 13. FIG. 15 is an enlarged view in the vicinity of the connecting passage 45 as seen from the rear cover 12 side. FIG. 16 is a view of the drive unit 100 as seen from the generator motor 17 side.

The coolant cooled by the radiator 1 flows into the inverter cooling passage 42, as shown in FIG. 13.

The coolant that has cooled the first power module 40 and the second power module 41 while passing through the inverter cooling passage 42 flows into the helical cooling passage 32 of the first inner housing 14 via the connecting portion 49 and the outer housing introduction passage 43, as shown in FIG. 14, and cools the drive motor 15.

The coolant that has cooled the drive motor 15 flows into the helical cooling passage 32 of the second inner housing 16 via the connecting passage 45, as shown in FIG. 15, and cools the generator motor 17, as shown in FIG. 16.

As described above, the coolant cools the inverter 13, the drive motor 15, and the generator motor 17, in that order. That is, in this embodiment, when viewed in the order of the coolant flow, the drive motor 15 is the upstream side motor and the generator motor 17 is the downstream side motor.

[Regarding Phase]

The phase setting method will be described with reference to FIGS. 17 to 20.

Figure 17:
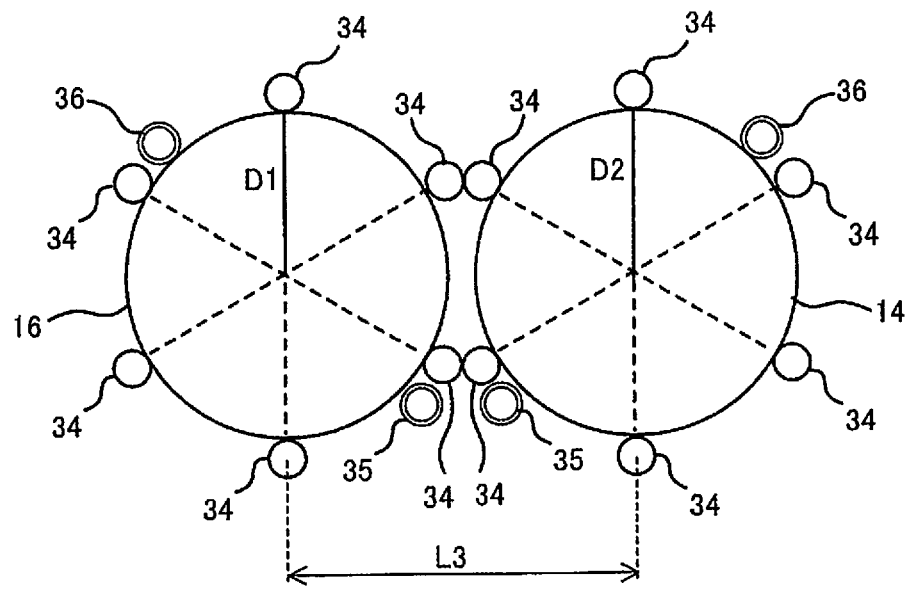
FIG. 17 is a diagram showing an arrangement of fastening parts when there is an even number of fastening parts.

FIG. 17 shows the case of an equally spaced arrangement of six fastening parts 34 in the circumferential direction, in the same manner as shown in FIG. 8, etc.

To make the drive unit 100 compact, the distance L3 between the axes of the first inner housing 14 and the second inner housing 16 must be reduced. In other words, the outer peripheries of the first inner housing 14 and the second inner housing 16 must be brought close together. To do so, as shown in FIG. 17, two of the fastening parts 34 on the second inner housing 16 side, from among the six fastening parts 34 of the second inner housing 16, and two of the fastening parts 34 on the first inner housing 14 side, from among the six fastening parts 34 of the first inner housing 14, must be respectively in phases opposite each other. The phase difference patterns that satisfy this condition are shown in FIGS. 19A to 19F.

Figure 19A:
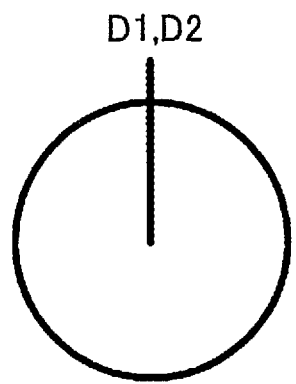
FIG. 19A is a diagram of a first example of phase difference when there is an even number of fastening parts.
Figure 19B:
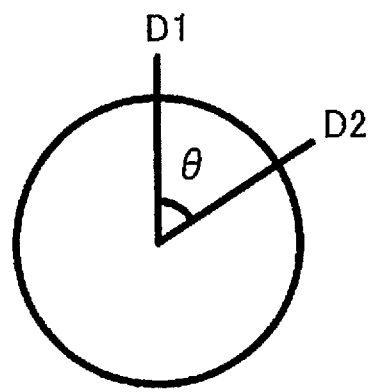
FIG. 19B is a diagram showing a second example of phase difference when there is an even number of fastening parts.
Figure 19C:
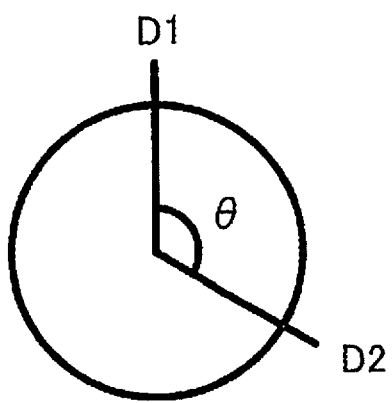
FIG. 19C is a diagram showing a third example of phase difference when there is an even number of fastening parts.
Figure 19D:
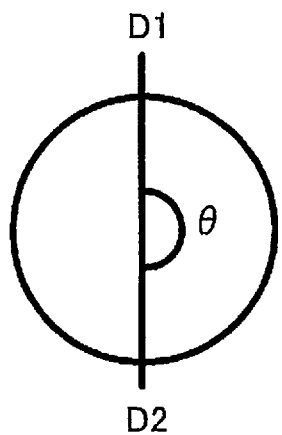
FIG. 19D is a diagram showing a fourth example of phase difference when there is an even number of fastening parts.
Figure 19E:
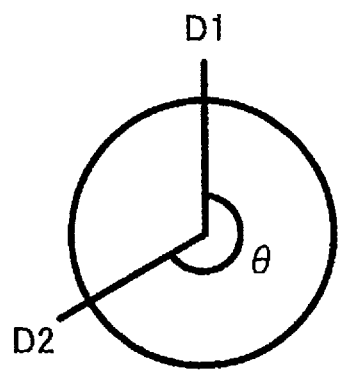
FIG. 19E is a diagram showing a fifth example of phase difference when there is an even number of fastening parts.
Figure 19F:
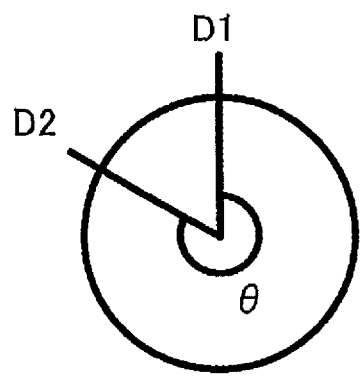
FIG. 19F is a diagram showing a sixth example of phase difference when there is an even number of fastening parts.
Figure 20A:
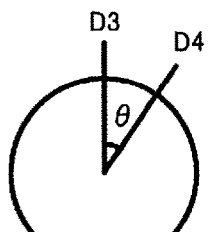
FIG. 20A is a diagram showing a first example of phase difference when there is an odd number of fastening parts.
Figure 20B:
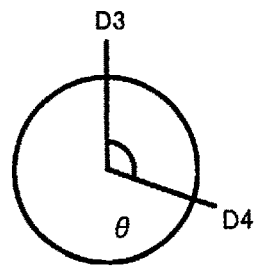
FIG. 20B is a diagram showing a second example of phase difference when there is an odd number of fastening parts.
Figure 20C:
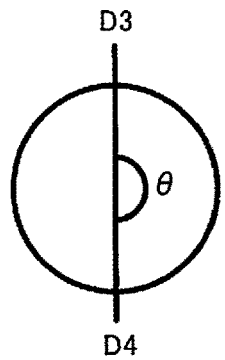
FIG. 20C is a diagram showing a third example of phase difference when there is an odd number of fastening parts.
Figure 20D:
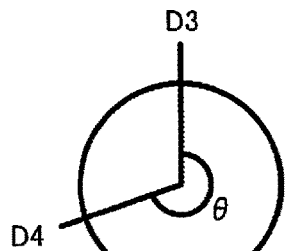
FIG. 20D is a diagram showing a fourth example of phase difference when there is an odd number of fastening parts.
Figure 20E:
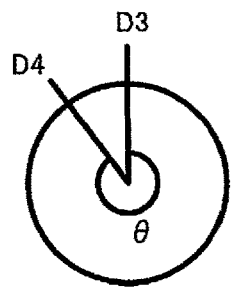
FIG. 20E is a diagram showing a fifth example of phase difference when there is an odd number of fastening parts.

FIG. 19A to 19F are diagrams in which the first inner housing 14 and the second inner housing 16 are concentrically superposed, and the phase difference is represented by reference lines D1, D2 that connect the centers and the respective reference fastening parts 34. FIG. 19A shows the state of FIG. 17, that is, the case in which the phase difference $\theta$ is zero. Here, the phase difference $\theta$ is a multiple of the value obtained by dividing 360 degrees by the number of fastening parts 34 (six), i.e., a multiple of 60 degrees. In this manner, the arrangement of the fastening parts 34 will be the same as that shown in FIG. 17 for any phase difference $\theta$.

FIGS. 19B to 19F show cases in which the phase difference $\theta$ is 60 degrees, 120 degrees, 180 degrees, 240 degrees, 300 degrees, and 360 degrees, respectively. That is, when there are six fastening parts 34, there are six possible patterns of the phase difference $\theta$, 60 degrees×0, 60 degrees×1, 60 degrees×2, ... 60 degrees×6. If there are an even number of fastening parts 34, the same concept as above can be applied. Specifically, where a is the number of fastening parts 34 and 360/a=b, the possible phase differences $\theta$ are 0×b, 1×b, 2×b, ..., a×b.

Figure 18:
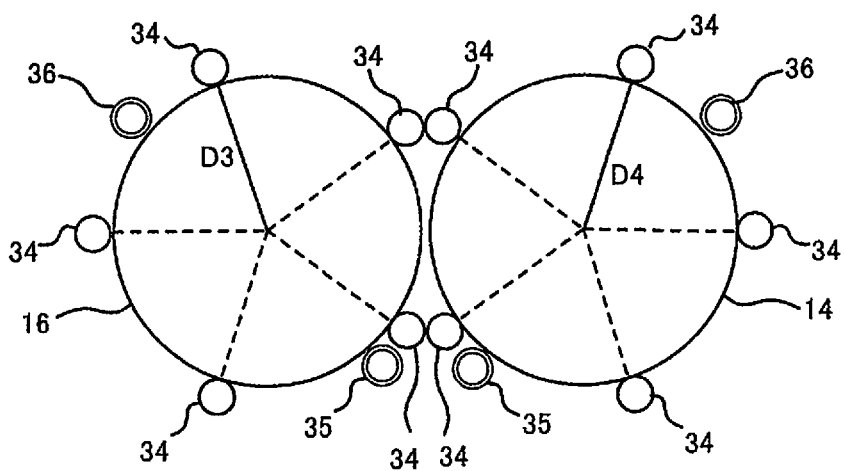
FIG. 18 is a diagram showing an arrangement of fastening parts when there is an odd number of fastening parts.

If there are an odd number of the fastening parts 34, on the other hand, the outer peripheries of the first inner housing 14 and the second inner housing 16 must still be brought close together in order to make the drive unit 100 have a compact configuration, in the same manner as when there are an even number of the fastening parts 34. For example, if there are five fastening parts 34, the arrangement would be as shown in FIG. 18. In FIG. 18, there is a phase difference between the first inner housing 14 and the second inner housing 16. That is, the reference line D3 of the first inner housing 14 and the reference line D4 of the second inner housing 16 are not parallel, and the phase difference $\theta$ is 360 degrees÷5÷2=36 degrees. The possible phase differences $\theta$ when the number of the fastening parts 34 is five are as shown in FIGS. 20A to 20E. FIGS. 20A to 20E show the phase differences $\theta$, in the same manner as in FIGS. 19A to 19F, and FIG. 20A shows the state of FIG. 18. The phase differences $\theta$ shown in FIGS. 20A to 20E are 36 degrees, 108 degrees, 180 degrees, 252 degrees, and 324 degrees, respectively. That is, the phase differences $\theta$ for an odd number of fastening parts 34 where the number of the fastening parts 34 is c and 360/c=d are 0×d+d/2, 1×d+d/2, 2×d+d/2, ... c×d+d/2.

One phase difference $\theta$ out of the possible phase differences $\theta$ described above will be adopted in accordance with the drive unit 100 to be used.

[Effects]

The effects of the configuration of this embodiment will now be described.

The drive unit 100 according to this embodiment is a drive unit of a series hybrid vehicle and comprises the drive motor 15 (first electric motor for driving) and the generator motor 17 (second electric motor). The first cylindrical inner housing 14 provided on the outer periphery of the stator of the drive motor 15 and the second cylindrical inner housing 16 provided on the outer periphery of the stator of the generator motor are each provided with the helical cooling passage 32 on the respective outer periphery, formed so as to surround each stator in helical fashion. The drive motor 15 and the generator motor 17 are housed in the outer housing 10 such that the rotor axes are parallel. The helical cooling passage 32 of the drive motor 15 and the helical cooling passage 32 of the generator motor 17 are connected in series via the connecting passage 45, and the first opening 35 (coolant outlet) of the helical cooling passage 32 on the upstream side to which one end of the connecting passage 45 is connected and the first opening 35 (coolant inlet) of the helical cooling passage 32 on the downstream side to which the other end of the connecting passage 45 is connected are arranged at the end portions on the same side in the direction of the rotor axis.

That is, in the helical cooling passage 32 on the upstream side, the first opening 35 becomes the coolant outlet, and in the cooling passage 32 on the downstream side, the first opening 35 becomes the coolant inlet. As a result, in any of the helical cooling passages 32, the length of the channel of the connecting passage 45 can be suppressed, compared with the case in which the first opening 35 is set as the coolant outlet and the second opening 36 is set as the coolant inlet. As a result, the drive unit 100 can be made compact.

In this embodiment, the first inner housing 14 and the second inner housing 16 are housed in the outer housing 10 so that the respective helical cooling passages 32 have different phases. In other words, the same parts can be used for the inner housing 14 that houses the drive motor 15 and the inner housing 16 that houses the generator motor 17. As a result, the parts count is reduced compared with the case in which two types of inner housings IHSGs are used, so that the manufacturing cost of the drive unit 100 can be suppressed. Further, although a case in which the diameter of the drive motor 15 and the diameter of the generator motor 17 are the same was described in the above embodiment, no limitation is imposed thereby; for example, if the motors to be used are changed and the diameter of the drive motor 15 and the diameter of the generator motor 17 are different, two types of inner housings IHSG could be used. However, even in this case, if the pitch of the helix of the helical cooling passage 32 on the upstream side matches the pitch of the helix of the helical cooling passage 32 on the downstream side, the flow path need not be redesigned. Here, the pitch of the helix is the distance between the valleys of the inner housing IHSG in the axial direction.

In this embodiment, the distance between the first opening 35 (coolant outlet) of the helical cooling passage 32 on the upstream side and the first opening 35 (coolant inlet) of the helical cooling passage 32 on the downstream side is shorter than the distance between the second opening 36 (coolant outlet) of the helical cooling passage 32 on the downstream side and the second opening 36 (coolant inlet) of the helical cooling passage 32 on the upstream side.

As a result, the length of the channel of the connecting passage 45 can be further suppressed.

In this embodiment, the inverter 13 is disposed on the upper portion of the outer housing 10, the first opening 35 (coolant outlet) of the helical cooling passage 32 on the upstream side is disposed below the rotor axis of the drive motor 15 (the electric motor on the upstream side), and the first opening 35 (coolant inlet) of the helical cooling passage 32 on the downstream side is disposed below the rotor axis of the generator motor 17 (the electric motor on the downstream side). That is, the inverter 13 is disposed in a position higher than the connecting portion between the connecting passage 45 and the two helical cooling passages 32. Thus, even in the event of a leak due to a problem in the connecting portion, leakage into the inverter circuit can be prevented.

Figure 10:
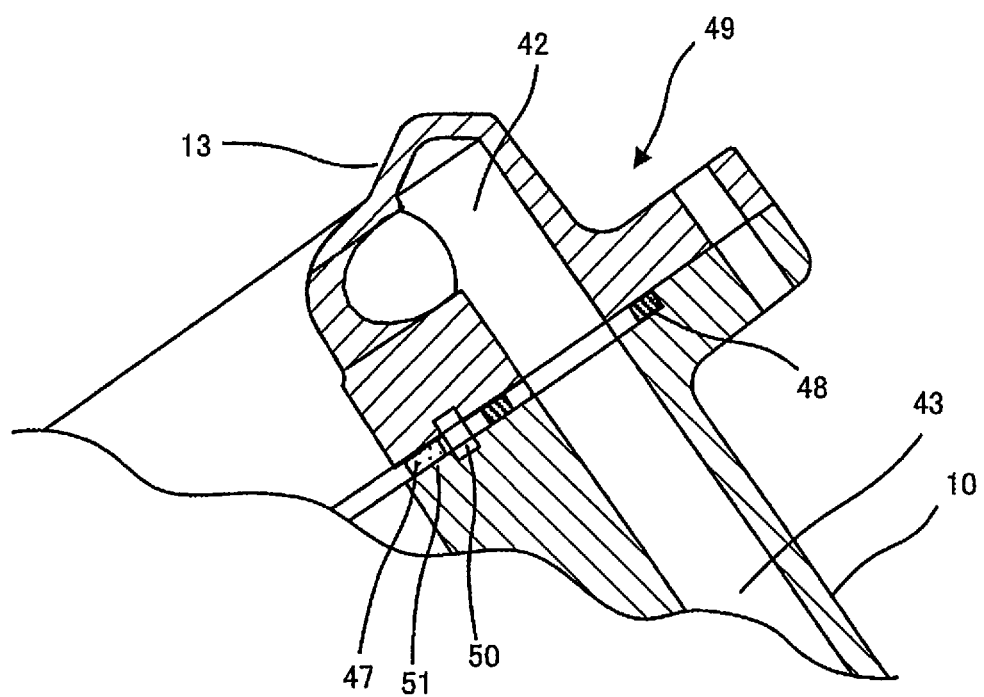
FIG. 10 is a cross-sectional view of the connecting portion.

In this embodiment, the inverter 13 is disposed on the upper portion of the outer housing 10, and, as shown in FIGS. 9 and 10, the outlet of the inverter cooling passage 42 is provided on the outside of the airtight seal of the inverter 13. The outlet of the inverter cooling passage 42 and the coolant inlet of the helical cooling passage 32 on the upstream side are connected via the outer housing introduction passage 43. Thus, even in the event of a leak due to a problem in the connecting portion between the inverter cooling passage 42 and the outer housing introduction passage 43, leakage into the inverter circuit can be prevented.

In this embodiment, the first opening 35 (the coolant outlet) of the helical cooling passage 32 on the upstream side is disposed on the side away from the generator motor 17 (the electric motor on the downstream side) with respect to the rotor axis of the drive motor 15 (the electric motor on the upstream side) as seen from the axial direction of the rotor axis. In other words, the coolant inlet of the helical cooling passage 32 on the upstream side is disposed on the side close to the outer edge of the outer housing 10 on the first inner housing 14 side. The coolant outlet of the helical cooling passage 32 on the upstream side is thus positioned near the helical cooling passage 32 on the downstream side, as shown in FIG. 8, and it is possible to suppress the length of the channel of the connecting passage 45.

In this embodiment, the outer housing 10 has a form in which a first cylindrical portion 10A housing the drive motor 15 (the first electric motor) and a second cylindrical portion 10B housing the generator motor 17 (the second electric motor) are adjacent, and has at least one rib 53 that connects the first cylindrical portion 10A and the second cylindrical portion 10B in the lower side valley between the first cylindrical portion 10A and the second cylindrical portion 10B. One of the ribs 53 has the connecting passage 45 (the channel) composed of the first vertical passage 45A (the first through-hole) that runs from the lower end surface of the rib 53 to the interior of the first cylindrical portion 10A, the second vertical passage 45C (the second through-hole) that runs from the lower end surface of the rib 53 to the interior of the second cylindrical portion 10B, the horizontal passage (the connection groove) 45B that is provided on the lower end surface of the rib 53 and that connects the first vertical passage 45A and the second vertical passage 45C, and the cover 46 (the lid member) that closes the horizontal passage 45B.

This allows the helical cooling passage 32 on the upstream side to be connected to the helical cooling passage 32 on the downstream side with a simple configuration while ensuring the rigidity of the outer housing 10.

In this embodiment, the first inner housing 14 and the second inner housing 16 are fixed to the outer housing 10 via the plurality of fastening parts 34 provided on the respective outer peripheral portions at equal intervals in the circumferential direction. If there are an even number of fastening parts 34, the phase difference between the first inner housing 14 and the second inner housing 16 is a multiple of the angle obtained by dividing 360 degrees by the number of the fastening parts 34 of each inner housing IHSG, and if there are an odd number of fastening parts 34, the phase difference is a multiple of the angle obtained by dividing 360 degrees by the number of the fastening parts 34 of each inner housing IHSG plus half of said angle.

More specifically, the angle for which the length of the channel of the connecting passage 45 is shorter is selected from the angles described above, in accordance with the positions of the first opening 35 and the second opening 36.

In this embodiment, the cover 46 is a plate-shaped member that only has the function of closing the horizontal passage 45B, but in the case that the drive motor 15, etc., are oil/water-cooled types, which use both oil and a coolant, the cover 46 may have the function of an oil cooler. For example, an oil passage may be formed inside the cover 46, and the configuration is such that heat is exchanged between the oil and the coolant that flows in the horizontal passage 45B.

An embodiment of the present invention was described above, but the above-described embodiment illustrates only some of the application examples of the present invention, and is not intended to limit the technical scope of the present invention to the specific configurations of the above-described embodiment.

The invention claimed is:

1. A drive unit for a series hybrid vehicle, the drive unit comprising:
an outer housing:
a first electric motor having a first rotor axis, and configured to drive the series hybrid vehicle; and
a second electric motor having a second rotor axis, and configured to generate electrical power,
the first electric motor including a first stator and a first cylindrical inner housing provided on an outer periphery of the first stator of the first electric motor,
the second electric motor including a second stator and a second cylindrical inner housing provided on an outer periphery of the second stator of the second electric motor,
the first cylindrical inner housing being provided with a first helical cooling passage helically surrounding the outer periphery of the first stator, the first helical cooling passage having a first coolant outlet and a first coolant inlet,
the second cylindrical inner housing being provided with a second helical cooling passage helically surrounding the outer periphery of the second stator, the second helical cooling passage having a second coolant outlet and a second coolant inlet,
the first electric motor and the second electric motor being housed in the outer housing such that the first and second rotor axes are parallel, and
the first helical cooling passage of the first electric motor and the second helical cooling passage of the second electric motor being connected in series via a connecting passage such that coolant supplied through the first helical cooling passage and the second helical cooling passage cools the first electric motor and the second electric motor, in that order, the coolant flowing in order from a radiator to an inverter cooling passage to the first helical cooling passage of the first cylindrical inner housing to the connecting passage to the second helical cooling passage of the second electric motor, and
one of the first and second coolant outlets of the first and second helical cooling passages being connected to an upstream side of the connecting passage, and one of the first and second coolant inlet of the other one of the first and second helical cooling passages being connected to a downstream side of the connecting passage, the one of the first and second coolant outlets and the one of the first and second coolant inlet of the other one of the first and second helical cooling passages being is connected are arranged at end portions on the same side in a direction of the first and second rotor axes.

2. The drive unit according to claim 1, wherein
the first cylindrical inner housing and the second cylindrical inner housing are housed in the outer housing such that the first and second helical cooling passages have different phases, respectively.

3. The drive unit according to claim 2, wherein
the first cylindrical inner housing and the second cylindrical inner housing are fixed to the outer housing via a plurality of fastening parts provided on respective outer peripheral portions at equal intervals in a circumferential direction,
if there are an even number of the fastening parts, a phase difference between the first cylindrical inner housing and the second cylindrical inner housing is a multiple of an angle obtained by dividing 360 degrees by a number of the fastening parts of each of the first and second cylindrical inner housings, and
if there are an odd number of the fastening parts, the phase difference between the first cylindrical inner housing and the second cylindrical inner housing is a multiple of the angle obtained by dividing 360 degrees by the number of the fastening parts of each of the first and second cylindrical inner housings plus half of the angle.

4. The drive unit according to claim 1, wherein
a distance between the one of the first and second coolant outlets on the upstream side and the one of the first and second coolant inlets on the downstream side is shorter than a distance between the other one of the first and second coolant outlets on the downstream side and the other one of the first and second coolant inlets on the upstream side.

5. The drive unit according to claim 1, further comprising
an inverter is disposed on an upper portion of the outer housing,
the one of the first and second coolant outlets on the upstream side is disposed below one of the first and second rotor axes of the first and second electric motors on the upstream side, and
the one of the first and second coolant inlets on the downstream side is disposed below one of the first and second rotor axes of the first and second electric motors on the downstream side.

6. The drive unit according to claim 5, wherein
the inverter is disposed on the upper portion of the outer housing,
a coolant outlet of the inverter is provided outside of an airtight seal of the inverter, and
the coolant outlet of the inverter and the one of the first and second coolant inlets on the upstream side are connected.

7. The drive unit according to claim 5, wherein
the one of the first and second coolant outlets on the upstream side is disposed on a side farther away from the one of the first and second electric motors that is on the downstream side with respect to the one of the first and second rotor axes of the other one of the first and second electric motors that is on the upstream side as seen from an axial direction of the first and second rotor axes.

8. The drive unit according to claim 1, wherein
the outer housing has a form in which a first cylindrical portion housing the first electric motor and a second cylindrical portion housing the second electric motor are adjacent,
the outer housing has at least one rib that connects the first cylindrical portion and the second cylindrical portion in a lower side valley between the first cylindrical portion and the second cylindrical portion, and
the at least one rib has a channel including a first through-hole that extends from a lower end surface of the rib to an interior of the first cylindrical portion, a second through-hole that extends from the lower end surface of the rib to an interior of the second cylindrical portion, a connection groove that is provided on the lower end surface of the rib and that connects the first through-hole and the second through-hole, and a lid member that closes the connection groove.

9. The drive unit according to claim 1, wherein
the outer housing includes a first opening and a second opening configured to receive the first and second electric motors, respectively.

10. The drive unit according to claim 1, wherein
the coolant flows from the first cylindrical housing of the first electric motor to the second cylindrical housing of the second electric motor without flowing through the radiator.

* * * * *